(12) United States Patent
Ortmann et al.

(10) Patent No.: US 12,313,607 B2
(45) Date of Patent: *May 27, 2025

(54) OPERATION OF AN INJECTOR OF A SAMPLE SEPARATION DEVICE

(71) Applicant: Agilent Technologies, Inc., Santa Clara, CA (US)

(72) Inventors: Thomas Ortmann, Straubenhardt/Ottenhausen (DE); Martin Seifried, Ettlingen (DE); Sam Wouters, Karlsruhe/Baden-Wuerttemberg (DE); Irina Spuling, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,447

(22) Filed: Feb. 1, 2024

(65) Prior Publication Data

US 2024/0201143 A1  Jun. 20, 2024

Related U.S. Application Data

(63) Continuation of application No. 17/730,553, filed on Apr. 27, 2022, now Pat. No. 11,946,913.

(30) Foreign Application Priority Data

Apr. 27, 2021 (DE) .......................... 102021110707.5

(51) Int. Cl.
*G01N 30/20* (2006.01)
*G01N 30/14* (2006.01)
(Continued)

(52) U.S. Cl.
CPC ............. *G01N 30/20* (2013.01); *G01N 30/14* (2013.01); *G01N 30/32* (2013.01); *G01N 2030/027* (2013.01); *G01N 2030/326* (2013.01)

(58) Field of Classification Search
CPC ........ G01N 30/20; G01N 30/14; G01N 30/32; G01N 2030/027; G01N 2030/326;
(Continued)

(56) References Cited

U.S. PATENT DOCUMENTS 5,242,586 A   9/1993 Ransohoff
11,946,913 B2 * 4/2024 Ortmann ................ G01N 30/14
(Continued)

FOREIGN PATENT DOCUMENTS

CN    103454363 A   12/2013
CN    108302029 A    7/2018
(Continued)

*Primary Examiner* — Robert R Raevis

(57) ABSTRACT

A sample separation device includes a separation path and a control unit. The separation path is between a fluid drive and a sample separation unit, and is configured to inject a fluidic sample in an injector path into a mobile phase in the separation path driven by the fluid drive to the sample separation unit for chromatographically separating the fluidic sample. The control unit is configured to control blocking the injector path or at least a partial path thereof, generating an overpressure in the blocked injector path or the partial path thereof by a pressure source, and subsequently fluidically coupling the injector path or the partial path thereof to a region of lower pressure than the overpressure to generate an expansion stroke for releasing unwanted components from the injector path.

20 Claims, 4 Drawing Sheets

(51) Int. Cl.
*G01N 30/32* (2006.01)
*G01N 30/02* (2006.01)

(58) Field of Classification Search
CPC ....... G01N 2030/201; G01N 2030/202; G01N 2030/207; G01N 30/22; G01N 3030/027
USPC ......... 73/23.41, 61.52, 61.55, 61.56, 863.71, 73/863.72, 864.21, 864.81, 864.83, 865.5; 422/70; 134/22.11, 22.12
See application file for complete search history.

(56) References Cited

U.S. PATENT DOCUMENTS

2016/0377580 A1* 12/2016 Wachinger ............. G01N 30/24
  73/61.55
2023/0184802 A1* 6/2023 Nogami ................. G01N 30/18
  422/67

FOREIGN PATENT DOCUMENTS

| | | |
|---|---|---|
| DE | 102009026640 A1 | 10/2009 |
| EP | 0309596 B1 | 3/1993 |
| JP | H0734007 B2 | 4/1995 |
| WO | 2014199198 A1 | 12/2014 |

\* cited by examiner

OPERATION OF AN INJECTOR OF A SAMPLE SEPARATION DEVICE

RELATED APPLICATIONS

This application is a continuation under 35 U.S.C. § 120 of U.S. patent application Ser. No. 17/730,553, filed on Apr. 27, 2022; which claims priority under 35 U.S.C. § 119(a) to German Patent Application No. DE 10 2021 110 707.5, filed Apr. 27, 2021, the entire contents of which are incorporated by reference herein.

TECHNICAL FIELD

The present invention relates to injectors, a sample separation device, and methods for controlling an injector.

BACKGROUND

In a HPLC, typically a liquid (mobile phase) at a very precisely controlled flow rate (for example in the range of microliters to milliliters per minute) and at a high pressure (typically 20 to 1000 bar and above, actually up to 2000 bar), at which the compressibility of the liquid may be noticeable, is moved through a so-called stationary phase (for example in a chromatographic column), to separate individual fractions of a sample liquid which is introduced in the mobile phase from each other. After passing the stationary phase, the separated fractions of the fluidic sample are detected in a detector. Such a HPLC-system is known from EP 0,309, 596 B1 of the same applicant, Agilent Technologies, Inc., for example.

A fluidic sample which is under atmospheric pressure may be brought to a high pressure in a separation path between a fluid drive and a sample separation unit by an injector. The fluidic sample may be injected into the separation path by switching a fluid valve. In such a sample injection, artifacts may occur which may negatively influence the accuracy of a separation result.

DE 10 2009 026 640 A1 discloses a sample reception device for the reception of a fluid sample, wherein the sample reception device comprises a sample loop for the reception of a sample volume, a sample receiving needle which is connected to the sample loop, a seat unit for detachably receiving the sample receiving needle, wherein the sample receiving needle is moved out of the seat unit, to receive the fluid sample, and a rinsing unit which is adapted for charging with a rinsing solution at a sample receiving needle which is at least partially moved out of the seat unit, so that the rinsing solution at least partially leaves through the seat unit.

SUMMARY

It is an object of the invention to perform a sample injection in a sample separation device, so that a sample separation result shows a high degree of reproducibility.

According to an exemplary embodiment of a first aspect of the present invention, an injector for injecting a fluidic sample from an injector path into a mobile phase in a separation path between a fluid drive and a sample separation unit of a sample separation device is provided, wherein the injector comprises a control unit which is configured for generating a first overpressure in a blocked first partial path of the injector path by a first pressure source, for (in particular simultaneously and/or independently) generating a second overpressure in a blocked second partial path of the injector path by a second pressure source, for subsequently fluidically coupling the first partial path with the second partial path for generating an expansion stroke for releasing a gas bubble in the injector path, and for rinsing the released gas bubble from the injector path.

According to another exemplary embodiment of the first aspect of the invention, a method for controlling an injector, in particular configured with the above described features, for injecting a fluidic sample from an injector path into a mobile phase in a separation path between a fluid drive and a sample separation unit of a sample separation device is provided, wherein the method comprises generating a first overpressure in a blocked first partial path of the injector path by a first pressure source, generating a second overpressure in a blocked second partial path of the injector path by a second pressure source, subsequently fluidically coupling the first partial path with the second partial path for generating an expansion stroke for releasing a gas bubble in the injector path, and rinsing the dissolved gas bubble from the injector path.

According to an exemplary embodiment of a second aspect of the present invention, an injector for injecting a fluidic sample into a mobile phase in a separation path between a fluid drive and a sample separation unit of a sample separation device is provided, wherein the injector comprises a control unit which is configured for determining an information which is indicative for an amount of gas in an injector path of the injector, and for taking an action depending on a result of the determination.

According to another exemplary embodiment of the second aspect of the invention, a method for controlling an injector, in particular configured with the above described features, for injecting a fluidic sample into a mobile phase in a separation path between a fluid drive and a sample separation unit of a sample separation device is provided, wherein the method comprises determining an information which is indicative for an amount of gas in an injector path of the injector, and taking an action depending on a result of the determination.

According to an exemplary embodiment of a third aspect of the invention, an injector for injecting a fluidic sample into a mobile phase in a separation path between a fluid drive and a sample separation unit of a sample separation device is provided, wherein the injector comprises a displaceable needle, a needle seat for fluid-tightly receiving the needle, and a control unit which is configured for controlling the injector, such that after moving the needle out of the needle seat, the needle seat is backwardly rinseable (i.e. in a flow direction from the needle seat towards the needle, if it would be received in the needle seat) by the fluid drive (in particular by the mobile phase which is delivered by the fluid drive).

According to another exemplary embodiment of the third aspect of the invention, a method for controlling an injector, in particular configured with the above described features, for injecting a fluidic sample into a mobile phase in a separation path between a fluid drive and a sample separation unit of a sample separation device is provided, wherein the method comprises moving a displaceable needle out of a needle seat which is configured for fluid-tightly receiving the needle, and subsequently backwardly rinsing the needle seat by the fluid drive.

According to yet another exemplary embodiment, a sample separation device for separating a fluidic sample is provided, wherein the sample separation device comprises an injector with the above described features for injecting the fluidic sample into a mobile phase, a fluid drive for driving the mobile phase and the fluidic sample which is injected into the mobile phase, and a sample separation unit for separating the fluidic sample which is injected into the mobile phase.

In the context of the present application, the term "injector" may in particular denote an apparatus by which a fluidic sample may be received in a sample reception volume and may be introduced into a flow path between the fluid drive and the sample separation unit by correspondingly switching an injection valve. A fluidic path which is assigned to such an injector may be denoted as injector path.

In the context of the present application, the term "fluidic sample" in particular denotes a medium, further in particular a liquid, which contains the material to be actually analyzed (for example a biological sample), such as a protein solution, a pharmaceutical sample, etc.

In the context of the present application, the term "mobile phase" in particular denotes a fluid, further in particular a liquid, which serves as a carrier medium for transporting the fluidic sample between a fluid drive and a sample separation unit. For example, the mobile phase may be a (for example organic and/or inorganic) solvent or a solvent composition (for example water and ethanol).

In the context of the present application, the term "fluid" in particular denotes a liquid and/or a gas, optionally comprising solid particles.

In the context of the present application, the term "fluid drive" may in particular denote a unit for delivering the mobile phase and the fluidic sample. In particular, the fluid drive may be a piston pump. The fluid drive may be configured as a fluid pump for generating a high pressure (for example at least 1000 bar) for delivering the mobile phase and the fluidic sample during the separation. The fluid drive may be configured as an analytical pump in the sample separation device.

In the context of the present application, the term "sample separation unit" may in particular denote a unit for separating a fluidic sample, in particular to different fractions. For this purpose, constituents of the fluidic sample may at first be adsorbed at the sample separation unit and may then be separately (in particular in fractions) desorbed. For example, such a sample separation unit may be configured as a chromatographic separation column.

In the context of the present application, the term "sample separation device" may in particular denote a device which is capable and configured to separate a fluidic sample, in particular to different fractions. For example, the sample separation may be performed by chromatography or electrophoresis. Preferably, the sample separation device may be a liquid chromatography sample separation device.

In the context of the present application, the term "partial path of an injector path" may denote a partial portion of the injector path with fluidic channels and/or fluidic components. The both partial paths may commonly form the complete injector path.

In the context of the present application, the term "blocked partial path" may denote a partial path of the injector path which comprises a fluidically non-connected (in particular locked) end, so that, when applying a pressure to the partial path, this pressure is not reduced, but an overpressure remains in the partial path due to the blocked end.

In the context of the present application, the term "pressure source" may denote an arbitrary entity which may provide a pressure for generating an overpressure in a partial path of the injector path. For example, such a pressure source may be a pump (for example a piston pump, such as a syringe pump, a peristaltic pump, a membrane pump, or a gear pump) or an overpressure terminal.

In the context of the present application, the term "expansion stroke" may in particular denote a sudden pressure impact, which is formed by an abrupt pressure equilibration when connecting pressurized partial paths of the injector path with each other and/or with a region of a lower pressure. Such an expansion stroke may lead to a release of an immobilized gas bubble in the injector path. By adjusting the overpressures in the previously non-connected partial paths of the injector path, the magnitude of the expansion stroke may be adjusted, to effectively promote a release of a gas bubble on the one hand, and to protect the components of the sample separation device against damage on the other hand.

In the context of the present application, the term "information which is indicative for an amount of gas in an injector path of the injector" may in particular denote each qualitative or quantitative information which is obtained by measurement, by calculation, empirically, and/or by simulation, for example, which gives information about the presence or absence and optionally about the amount of gas in a fluidic path in the interior of the injector. For example, such a gas may be gas inclusions, for example air bubbles, in an injector path in which the fluidic sample may be received prior to injecting into a separation path. For example, such gas inclusions may be located, collected, or adhered at fluidic connections of a fluid component in the injector path, for example at an inlet or outlet of a metering unit.

In the context of the present application, the term "taking an action" may in particular denote a control action with respect to the operation or non-operation or an operation mode of the injector, which may be a consequence of the determined information and/or may be selected on its basis. A possible action which may be taken, for example when determining no or an acceptably low amount of gas in the injector path, is performing the sample reception process, the injection process, and the separation process of the fluidic sample according to the plan. On the contrary, when an unacceptably high amount of gas, for example an excess of gas or an amount of gas beyond an acceptance level or an acceptance range in the injector path is determined, possible actions are a stop or a non-performance of a sample receiving process, an injection process, and a separation process, or a counteraction, to reduce the amount of gas to an acceptable value or even to set it back to zero. Other actions are possible, for example triggering an alarm or a notice to a user.

According to an exemplary embodiment of the first aspect of the invention, an effective mechanism is provided, to release undesired gas bubbles in an injector path of an injector and to remove them from the injector path. Thereby, it may be ensured that no undesired gas bubbles remain in the injector path, which, in particular in case of fluidic samples with a small volume, may generate artifacts in a separation result (for example in a chromatogram). Thereby, in particular the reproducibility and/or repeating accuracy, but also the correctness, of a separation result may be promoted. This may in particular be performed by the fact that by separately compressing and only subsequently connecting of previously separated and blocked fluidic partial paths of an injector path in an injector of a sample separation device, a sudden, but controllable expansion stroke or pressure impact may be generated by a pressure equilibration which releases a gas bubble which adheres to a metering unit of the injector, for example, so that the released gas bubble may subsequently be rinsed out of the injector, for example by a transport by a mobile phase. Such a procedure may preferably be utilized after a solvent exchange, i.e. before a first separation run with a fluidic sample, or between consecutive separation runs for separating a fluidic sample. Thus, in an advantageous manner, an expansion stroke on a gas bubble may be generated by coupling two conduits which are at first separated from each other and are under pressure, followed by a subsequent rinsing of the released gas bubble(s). Advantageously, such a mechanism may be activated independently from the fact which pressure source (for example pump) performs a compression and/or a rinsing. Such a pressure source may be a rinsing pump, a metering pump, or an analytical high pressure pump, for example.

According to an exemplary embodiment of the second aspect of the invention, prior to injecting a fluidic (preferably liquid) sample which is received in an injector path of an injector of a sample separation device into a separation path between a fluid drive and a sample separation unit, an analysis may be performed, if a usually undesired, for example excessive, amount of gas is present in the injector path. For example, a purely qualitative determination is possible, if gas is present in the injector path. However, also a quantitative determination is possible, how large this amount of gas is or to which size range this amount of gas is assigned to. Depending on the result of the determination, a targeted action with respect to the further operation of the injector may be taken. In this way, in particular a falsification or a lack of repetition accuracy of a separation result may be avoided, which are caused by artifacts in connection with air bubbles or the like in the region of a fluidic sample to be separated. By recognizing the possibility of gas-induced artifacts already before performing a sample separation, in particular before receiving a fluidic sample to be separated in an injector, on the one hand incorrect separation results may be avoided and on the other hand the performance of a sample separation with a valuable fluidic sample may be prevented, whose result, due to the presence of an excess of gas, would have no or only a limited significance. For example, the fluidic sample may only be subjected to a sample separation, when counteractions are taken, to remove the gas from the injector path or to at least reduce the gas to an acceptable amount. In particular, according to the described aspect, a recognizing of an air bubble by a determination of the compressibility of the fluid in the injector path of the path is enabled.

According to an exemplary embodiment of the third aspect of the invention, a needle and a needle seat with a sample reception volume, a metering unit, and an injection valve of the injector may be fluidically coupled, to cooperate for receiving the fluidic sample. For this purpose, the needle may be moved out of the needle seat by a robot, for example, to suck the fluidic sample in the sample reception volume. For injecting, the needle may then be retracted in the needle seat. The received fluidic sample may therefore be injected into the mobile phase between the fluid drive and the sample separation unit. According to a so-called "feed inject" injection mode, this may be descriptively performed by combining the received fluidic sample with the mobile phase at a fluidic T-position (which may be located in the interior of an injection valve, for example), and by delivering to the sample separation unit by the fluid drive. In the process of injecting, sample residues may remain in the fluidic conduits and also in the needle seat, which may lead to an undesired carryover of sample in subsequent separation runs. Advantageously, the needle seat according to the described embodiment may be rinsed without providing a separate rinsing pump for this purpose, namely in a backwards direction, to avoid an undesired spreading of the fluidic sample or other substances in the injector path. With advantage, for this purpose, the injection valve may be switched such that the fluid drive (i.e. the analytical pump) is used for delivering a mobile phase to the sample separation unit by a corresponding switching of the injection valve for backwardly rinsing the needle seat, i.e. in a rinsing direction from the needle seat towards the sample needle, if it would be placed in the needle seat. Thereby, an especially simple configuration with respect to the apparatus is achieved. In particular, a backwards rinsing of the valve seat via the analytical pump may be performed in a "feed injection" position of an injection valve.

In the following, additional embodiments of the injectors, the sample separation device, and the methods are described.

According to an embodiment, the injector may comprise an injection valve which is controllable by the control unit, such that, by the injection valve, the first partial path and/or the second partial path are blocked. Such a fluidic injection valve, which is for example configured as rotor valve, at least in a switching state may comprise at least two ports, one of which is fluidically coupled with the first partial path and the other is fluidically coupled with the second partial path, wherein besides the at least two ports are fluidically non-connected. When in each of both partial paths a pressure source (for example a respective pump) is connected, by generating an overpressure by the respective pressure source, a pressure may be generated in the respectively blocked partial path. By transferring the injection valve in another switching state, the ports, which were previously non-connected on one side, may then be fluidically connected with each other, to thereby cause the expansion stroke.

According to an embodiment, the injector may comprise the first pressure source and/or the second pressure source. According to the described embodiment, the both pressure sources form a part of the injector. For example, the first pressure source may be a rinsing pump and the second pressure source may be a metering unit (for example a syringe pump) of the injector. Both the rinsing pump (as the first pressure source and for rinsing) and the metering unit (as the second pressure source and for metering a fluidic sample to be received) may then respectively fulfill a double function, which enables an especially compact configuration of the injector. According to another embodiment, at least one of the first pressure source and the second pressure source of the injector may be a pressure source which is separate from the rinsing pump and the metering unit, for example a further pump or a terminal to a high pressure conduit.

According to another embodiment, at least one of the first pressure source and the second pressure source may be a component of the fluid separation device outside the injector. For example, a fluid drive (for example an analytical or high pressure pump) which is configured for delivering the mobile phase—and during a separation run additionally for delivering the fluidic sample to a sample separation unit—may be used as the first pressure source and/or second pressure source during a process for freeing the injector path from a gas bubble.

Thus, the first pressure source and/or the second pressure source may be selected from a group which is consisting of a rinsing pump for rinsing the injector path, a metering unit for metering a fluidic sample in the injector path, the fluid drive, a high pressure terminal, and a separate further pump.

According to an embodiment, the second partial path may comprise a metering unit for metering a fluidic sample as the second pressure source. In contrast, the first partial path may comprise a rinsing pump as the first pressure source.

According to an embodiment, the control unit may be configured, in the blocked state of the partial paths, to control the second pressure source for generating a higher pressure than the first pressure source. The pressure difference in both partial paths may then promote an effective and precisely controllable expansion stroke. For example, the second partial path may be brought to an overpressure which corresponds to a system pressure between the fluid drive and the sample separation unit. The first partial path may be brought to another overpressure above the ambient pressure, but preferably below the system pressure. For example, the control unit may be configured, in the blocked state of the first partial path, to control the first pressure source for generating a pressure in a range from 100 bar to 300 bar, in particular in a range from 150 bar to 200 bar. For example, the control unit may be configured, in the blocked state of the second partial path, to control the second pressure source for generating a pressure in a range from 400 bar to 2000 bar, in particular in a range from 700 bar to 1500 bar.

According to an embodiment, the control unit may be configured to control the first pressure source for delivering a mobile phase for rinsing the released gas bubble from the injector path. When the first pressure source is a rinsing pump, a solvent may be used by this rinsing pump which is typically delivered for rinsing, to rinse the gas bubble which is released by the expansion stroke from the injector path.

According to an embodiment, the control unit may be configured to control the first pressure source only after generating the expansion stroke for delivering the mobile phase. Therefore, the rinsing pump for delivering the rinsing liquid may be controlled only when the expansion stroke by the connection of both partial paths has been carried out. In other words, connecting both partial paths or detecting the expansion stroke may be the trigger for the start of the delivery of the mobile phase for rinsing the released gas bubble.

According to an embodiment, the control unit may be configured to control an injection valve for rinsing the gas bubble, such that the injector path is fluidically coupled with a waste conduit, in particular with a waste conduit on ambient pressure, by the injection valve. Switching the injection valve may be performed from a switching position with two blocked partial paths—for a build-up of pressure—to another switching position with two fluidically coupled partial paths—for rinsing the gas bubble via a waste conduit. The waste conduit may be on ambient pressure, for example, so that a pressure equalization between the partial paths which are at first still under pressure and the waste conduit, and consequently a rinsing of the gas bubble is automatically performed.

According to an embodiment, the control unit may be configured to repeat generating the overpressures, coupling, and rinsing at least one time, until the injector path is free from gas bubbles and/or until the injector path comprises an amount of gas below a pre-given threshold value. The decision, if after the performance of the described procedure for removing gas bubbles, gas bubbles are still left in the injector path, may be performed by a measurement of the compressibility of the fluid in the injector path, for example.

According to an embodiment, the control unit may be configured for determining an information which is indicative for a presence or an absence of a gas bubble in the injector path, and for generating the overpressures, for coupling, and for rinsing only in the case, when the determined information is indicative for the presence of a gas bubble in the injector path. For example, this information determination may encompass a determination of the compressibility of the fluid (for example of the liquid mobile phase and of possible gas bubbles) in the injector path, as described in more detail below. For example, only when the compressibility exceeds a certain threshold value, the presence of at least one gas bubble in the injector path may be assumed, which may then be the trigger for releasing (by the expansion stroke) and rinsing (by the solvent delivery through the injector path) the gas bubble.

According to an embodiment, the control unit may be configured for determining the information, if an undesired amount of gas is present in the injector path, in particular if a gas bubble is present in the injector path. Although a certain, low amount of gas in the injector path may be accepted without a deterioration of a sufficiently precise sample separation, for an excess of gas this may not be the case anymore. Consequently, also a quantitative information may be captured or determined, which allows a conclusion to a quantity of gas in the injector path.

According to an embodiment, the control unit is configured, if determining the information yields an undesired amount of gas in the injector path, to trigger, as the action to be taken, at least partially removing the gas from the injector path. In particular, an action may be taken which causes a reduction of the amount of gas in the injector path to a value below a critical threshold value.

According to an embodiment, the control unit may be configured, for determining the information, to fully or partially (for example in a partial path or separately from each other in different partial paths) block the injector path, and to compress the fluid which is present in the injector path. For example, an injection valve may be switched for this purpose, so that a pressure source (for example a metering pump and/or a high pressure pump) exerts a compression force on the fluid in the injector path or in respective partial paths of it, to determine a reaction of the fluid on its compression. If the fluid contains a relatively high amount of gas, the exertion of pressure, due to the high compressibility of gases, leads to a strong reduction of the fluid volume in the injector path. In contrast, if the fluid contains a relatively high amount of liquid, the exertion of pressure, due to the low compressibility of liquids, leads to an only low reduction of the fluid volume in the injector path. Therefore, blocking the injector path and the detection and the analysis of a reaction of the system on an overpressure which is applied to the injector path enable a reliable and precise conclusion to an amount of gas in the injector path.

According to an embodiment, the control unit may be configured to compress the fluid which is present in the injector path or in a partial path thereof, by actuating a metering unit which is configured for metering the fluidic sample. In the context of the present application, the term "metering unit" may in particular denote a unit for delivering in a metered manner a specified amount of the fluidic sample in a sample reception volume of the injector. In particular, a metering unit may draw a desired amount of the fluidic sample in the sample reception volume. For example, the metering unit may be configured as syringe pump with a movable piston. Advantageously, according to the described embodiment, such a metering unit which is adapted for metering the fluidic sample may also be synergistically co-used for compressing the injector path, to qualitatively and/or quantitatively determine an amount of gas in the injector path. In this way, the effort with respect to the apparatus for identifying the gas in the injector path may be kept low.

According to an embodiment, the control unit may be configured to determine, in particular to calculate and/or to detect, the compressibility of the fluid which is present in the injector path for determining the information. Compressibility may denote the relative change in volume (i.e. volume change with respect to a total volume) of the fluid in the injector path at a certain pressure change. For determining the compressibility, a pressure sensor may be implemented in the injector path, for example, which measures the pressure values, the pressure course, or the pressure change during compressing the injector path. By determining a piston position in a piston chamber of a pressure source for compressing the injector path, in particular a metering pump, a volume change may then be determined, which in turn enables the determination of the compressibility. The system volume of the injector path may be pre-known. By the measurement of the compressibility, it may be detected, if a gas bubble removal from the injector path is necessary or not.

According to an embodiment, the control unit may be configured to perform determining the information prior to injecting the fluidic sample into the mobile phase in the separation path between the fluid drive and the sample separation unit. By identifying possible problems in connection with an excess of gas in the injector path prior to the actual sample separation process, a useless and not usable, respectively, separation run may be avoided. Furthermore, a valuable sample may be protected from a not usable sample separation and thus against a sample loss.

In particular, determining the information may be performed prior to receiving the fluidic sample in a sample reception volume of the injector. In this case, the fluidic sample may stay in a protected manner in a sample source (such as a sample container, also called vial), while the injector is examined with respect to possible gas inclusions. Only after a successive determination of a sufficiently low amount of gas in the injector path, a reception of the sample from the sample source in the injector path may be performed, such that a protection of valuable sample material is achieved.

According to an embodiment, the control unit may be configured to assume an undesired amount of gas, when a determined parameter which is indicative for an amount of gas exceeds a predetermined threshold value. For example, a maximum value of an amount of gas or a gas portion in the injector path may be defined, wherein, in the case when it is exceeded, an injection of the fluidic sample into the separation path without a further action may be omitted. The magnitude of the predetermined threshold value may be selected depending on a required accuracy of a separation run, for example.

According to an embodiment, the control unit may be configured to assume an undesired amount of gas, when a determined parameter which is indicative for an amount of gas shows a deviation from a previously determined parameter which is indicative for a previous amount of gas, which deviation is outside a predetermined acceptance range. Additionally or supplementary to a maximum threshold value of an amount of gas in the injector path which is just acceptable or just not acceptable anymore, an undesired amount of gas may also be assumed in the case, when between two subsequent separation runs an excessive deviation of an amount of gas in the injector path occurs, for example when the deviation of a determined compressibility exceeds ±5%. By considering such a relative deviation between subsequent separation runs, a reproducibility of a sample separation may be ensured.

According to an embodiment, the control unit may be configured to remove at least a part of the fluid (in particular gas) from the injector path, in particular to discharge it in a waste conduit. In the context of the present application, the term "waste conduit" may in particular denote a fluid conduit, along which the fluid which is not required anymore (for example the mobile phase and/or the fluidic sample and/or a rinsing fluid) may be drained to a waste container. For example, the entire injector path, or only a part of it, may be evacuated towards a waste conduit, for example when the determination yields an excess of gas in the injector path.

According to an embodiment, the control unit may be configured to decompress the compressed fluid which was previously present in the injector path, for removing the at least one part of the fluid, in particular by switching an injection valve of the injector. In the context of the present application, the term "injection valve" may in particular denote a fluidic switching element which may be brought into different switching positions, to enable or to disable different fluidic connection paths in the injector. For this purpose, the injection valve may comprise multiple (in particular two) valve bodies which are movable relative to each other, which may be moved relative to each other (in particular rotated and/or displaced) in a rotational and/or translatory manner, for example. If the fluid in the injector path was previously compressed, for example to determine a compressibility for determining an amount of gas in the injector path, the associated overpressure may be used to automatically discharge the fluid from the injector path by relaxing the injector path by correspondingly switching an injection valve. Descriptively, the fluid flows from the injector path which is under elevated pressure into the environment, for example in a waste conduit which is connected with the injection valve.

According to an embodiment, the control unit may be configured to rinse the injector path by a rinsing pump for removing the at least one part of the fluid, in particular towards a waste conduit. In particular, the control unit, for removing the at least one part of the fluid, may be configured to at least partially evacuate and/or to rinse the injector path by the rinsing pump, by actuating the rinsing pump. Then, the rinsing pump may rinse the injector path empty with a sufficiently large pumping pressure and may thus remove the fluid in the injector path which is provided with an excessive amount of gas from the injector path, for example via a waste conduit. For this purpose, the rinsing pump may rinse the injector path with a rinsing fluid, for example a solvent composition. Alternatively or supplementary to the rinsing pump, also a metering pump may drain the fluid in the injector path from the injector path. However, a continuously delivering rinsing pump may be preferred for this purpose.

According to an embodiment, the control unit may be configured, if determining the information does not yield an undesired amount of gas, as action to be taken, to control the injector for receiving a fluidic sample in a sample reception volume, and for injecting the received fluidic sample into the mobile phase in the separation path between the fluid drive and the sample separation unit. If no gas is determined in the injector path, or a sufficiently low amount of gas within a pregivable acceptance range, the action may be taken, to perform the sample injection corresponding to a sample separation method to be processed.

According to an embodiment, the control unit, after at least partially removing the gas from the injector path, may be configured for repeatedly determining an information which is indicative for an amount of gas in the injector path, and, if repeatedly determining still yields an undesired amount of gas, as action to be taken, to trigger repeatedly at least partially removing the gas from the injector path. Thus, when an excess of gas was detected in the injector path, and for solving this problem, the gas-containing fluid was discharged from the injector path, the procedure of the information determination and taking a corresponding action may be repeated. In contrast, when the excess is removed, another action may be taken, for example a sample injection into the separation path may be performed. On the contrary, if still an unacceptable incorrect value of gas is in the injector path, the procedure of removing the fluid from the injector path may be repeated again (and multiple times, if necessary), for example until the repeatedly determined information indicates the presence of now acceptable gas conditions (for example an acceptably low compressibility in the injector path).

According to an embodiment, the injector may comprise a sample reception volume for receiving a volume of the fluidic sample. For example, such a sample reception volume may be a sample loop, in which—for example by a sample needle which is inserted into a sample container—a desired amount of a fluidic sample to be separated may be received.

According to an embodiment, the injector may comprise a metering unit for metering a fluidic sample to be received in a sample reception volume, and for compressing the fluid in the injector path. For example, such a metering unit may be a syringe pump which may comprise a piston which is forwardly and backwardly movable in a piston chamber for delivering the fluid, and preferably inlet- and/or outlet valves for defining a delivering direction.

According to an embodiment, the injector may comprise a waste conduit for discharging the fluid from the injector path. Such a waste conduit may be connected to an injection valve and may discharge the fluid to a waste container which is connected to the waste conduit in a corresponding valve position.

According to an embodiment, the injector may comprise an injection valve which is fluidically coupled with the sample reception volume, the metering unit, and the waste conduit, and which is switchable by the control unit, to block the injector path. Such an injection valve may be a rotor valve with a rotatable rotor element and a stationary stator element, wherein ports of the stator element may be fluidically coupled or fluidically decoupled with fluid connections (for example grooves) of the rotor element depending on a rotational position.

The sample separation device may be a microfluidic measuring device, a life science device, a liquid chromatography device, a gas chromatography device, an HPLC (high-performance liquid chromatography) device, a UHPLC (ultra-high-performance liquid chromatography) device, or an SFC (supercritical liquid chromatography) device. However, many other applications are possible.

According to an embodiment, the sample separation unit may be configured as chromatographic separation unit, in particular as chromatography separation column. In a chromatographic separation, the chromatography separation column may be provided with an adsorption medium. At this, the fluidic sample may be retained and may be only subsequently released in fractions in the presence of a specific solvent composition, whereby the separation of the sample in its fractions is accomplished.

For example, a pumping system for delivering the fluid may be configured to transport the fluid and/or the mobile phase with a high pressure, for example several 100 bar up to 1000 bar and more, through the system.

The sample separation device may comprise a sample injector for introducing the sample into the fluidic separation path. Such a sample injector may comprise an injection needle which is couplable with a seat in a corresponding liquid path, wherein the needle may be moved out of this seat, to receive the sample, wherein after re-introducing the needle in the seat, the sample is located in a fluid path, which, for example by switching a valve, is connected with the separation path of the system, which leads to an introduction of the sample into the fluidic separation path. In another embodiment of the invention, a sample injector and sampler, respectively, with a needle may be used, which is operated without a seat.

The sample separation device may comprise a fraction collector for collecting the separated components. Such a fraction collector may lead the different components of the separated sample in different liquid containers, for example. However, the analyzed sample may also be supplied to a drain container.

Preferably, the sample separation device may comprise a detector for a detection of the separated components. Such a detector may generate a signal which may be observed and/or recorded, and which is indicative for the presence and the amount of the sample components in the fluid which is flowing through the system.

BRIEF DESCRIPTION OF THE FIGURES

Other objects and many of the accompanying advantages of embodiments of the present invention become easy to recognize and better understandable under reference to the following detailed description of embodiments in connection with the accompanying drawings. Features which are substantially or functionally the same or similar, are provided with the same reference signs.

Figure 1:
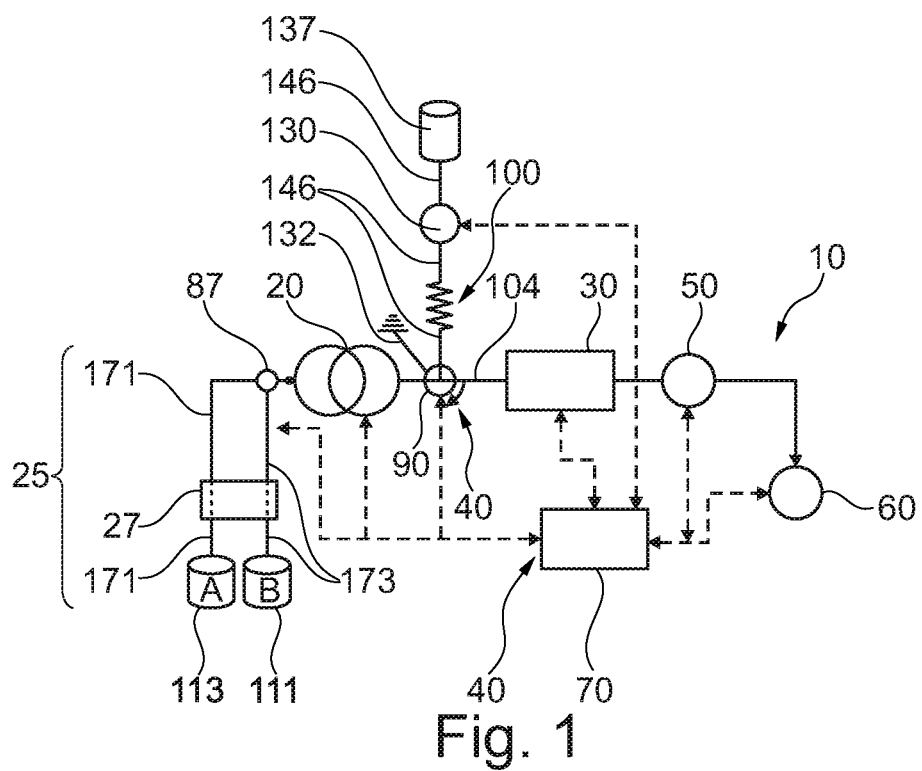
FIG. 1 shows a HPLC system with an injector which comprises an injection valve according to an exemplary embodiment of the invention.

The illustrations in the drawings are schematic. Thus, the figures are not exact construction drawings.

DETAILED DESCRIPTION

Before referring to the figures and describing exemplary embodiments, some basic considerations shall be summarized, based on which the exemplary embodiments are derived.

According to an exemplary embodiment of a first aspect of the invention, an attached gas bubble (in particular an air bubble) may be released and removed from an injector path by first bringing two partial paths of the injector path to an overpressure independently from each other, by subsequently fluidically coupling both partial paths with each other for generating an expansion stroke for releasing the gas bubble, and by subsequently delivering the released gas bubble with solvents out of the injector path.

In particular in poorly rinseable corners of the injector path, gas bubbles may form and even attach, for example at an inlet or outlet of a metering unit (in particular a syringe pump) of the injector. For example, a gas bubble may be formed at a metering unit, when it is rinsed by a rinsing pump with a rinsing liquid which is not or not completely degassed. In particular, in case of small sample volumes (for example on the order of magnitude of 1 µL), such gas bubbles (for example also with a volume on the order of magnitude of 1 µL) may artificially influence the volume of a sucked fluidic sample. An undesired gas load in the injector path may lead to poorly reproducible and even inaccurate separation results, and in particular to a poor repeating accuracy.

According to a first variant of the first aspect, for example, a rinsing pump may first rinse the injector path, for example in case of a solvent replacement. By switching an injection valve, the injector path may then be separated into two partial paths which are fluidically separated from each other, which may be brought to a pressure which is elevated with respect to the atmospheric pressure independently from each other. In a blocked partial path, this may be accomplished by the metering unit, and in the other blocked partial path by the rinsing pump. In particular, the metering unit may provide a higher overpressure (for example 1200 bar) than the rinsing pump (for example 200 bar). By again switching the injection valve, both partial paths may be fluidically coupled with each other, so that the mobile phase from the partial paths relaxes by an expansion stroke which is caused by a pressure equalization via a waste conduit and drains out of the injector path. By this expansion stroke, the gas bubble may descriptively be shaken free, for example may be shaken free from the metering unit. At the same time, the rinsing pump starts to rinse the injector path by the rinsing liquid. Thereby, the rinsing pump also rinses out the released gas bubble, supported by a forwardly directed flow of a rinsing liquid. If necessary, the process of releasing and rinsing out gas bubbles may be repeated, until the injector path is sufficiently poor in gas or even free of gas. For example, the process may be repeated, until a determination of the compressibility in the injector path indicates that the compressibility of the fluid in the injector path has become sufficiently low.

According to a second variant of the first aspect, starting from a switching position of the injection valve after a sample injection according to the injection principle of "feed injection", the partial path of the injector path which contains the metering unit may still be at the system pressure, i.e. at the high pressure which was generated in the separation run. In this case, the second partial path is therefore already under overpressure, so that, in the blocked state of both partial paths, only the first partial path has to be brought to overpressure by the rinsing pump. The further procedure of a gas bubble removing procedure may then be performed corresponding to the first variant, i.e. by connecting both partial paths for generating an expansion stroke and by subsequently rinsing the thus released gas bubble(s).

Removing the gas load from an injector path according to the first aspect may be used both for the sample injection principle "feed inject" and for the sample injection principle "flow through injection". According to the sample injection principle "feed inject", at a fluidic T-position, the received fluidic sample may be combined with the mobile phase and may be delivered by the fluid drive to the sample separation unit. According to the alternative sample injection principle "flow through injection", a sample reception volume of the injector which was previously filled with the fluidic sample may be connected to a separation path between the fluid drive and the sample separation unit.

According to an exemplary embodiment of a second aspect of the invention, in an injector path of the sample separation device, prior to injecting a fluidic sample into a separation path, the potential presence of gas in the injector path may be determined—in particular an undesired excess of gas in the injector path may be recognized—and depending on the result of the determination process, a suitable action may be taken—for example completely or at least partially discharging the gas from the injector path. Thereby, in particular a high pressure air removal for a HPLC injector may be achieved. Thereby, the correctness and the reproducibility of separating results of a sample separation device, in particular a liquid chromatography sample separation device, may be improved, since in this way, artifacts which are caused by gas inclusions may be effectively suppressed in a (in particular chromatographic) sample separation.

In order to assess the quality of a sample collection event of a liquid or the capability of a sample collecting unit to perform such an event exactly and precisely, the fluid path of the sample collecting unit—also denoted as injector path—may be compressed to a given pressure above the ambient pressure before or after the sample collection event. When the injector path is blocked in the meantime, the compressibility of the fluid in the injector path may be calculated. This value may then be compared with an upper limit which is pre-given or predefined, for example. Alternatively or additionally, also a comparison of this value with a previously stored value is possible. If the boundary value and/or the predefined upper limit is exceeded and/or if the deviation from the stored value is outside a predefined acceptance range (for example is larger than ±5%), on this basis the presence of an undesirably high amount of air in the injector path may be recognized. Such an excess of gas in the injector path may impede the correct operation of the injector and/or the sample collection unit. Advantageously, recognizing this event may trigger a procedure and/or may lead to taking an action. An action that is taken when an excess of gas in the injector path is determined may be a compression and a rinsing of the injector path, for example, to remove gas (in particular air) from the injector path. A compressibility value which yields after taking this action may in turn be compared with previous values, to assess whether the method was successful, whether it is to be repeated, or whether another action is to be taken (for example a prime-method for removing air is triggered).

According to an exemplary embodiment of a third aspect of the invention, in a sample separation device with an injector and an arrangement of a needle seat and a needle for sucking the fluidic sample, a backwards rinsing of the needle seat after moving the needle out of the needle seat may be performed with a rinsing solution that is delivered by a fluid drive of the sample separation device. In other words, an analytical pump of the sample separation device which delivers the mobile phase from the fluid drive to a sample separation unit in the separation operation may be used in a rinsing operation, to deliver the mobile phase as rinsing solution backwardly through the needle seat. In this way, providing a separate rinsing pump for backwardly rinsing the needle seat may be omitted, and therefore the injector may be configured especially compact. It may be especially preferred in such an embodiment to configure the injector according to the injecting principle of the "feed injection", wherein the fluidic sample that is delivered by a metering unit from a sample receiving volume of the injector at a fluidic T-connection (preferably in the interior of an injection valve) is combined with the mobile phase that is delivered by the fluid drive, and is delivered to a sample separation unit. Descriptively, in such an injector according to the injection principle "feed injection", the backwards rinsing of the needle seat may be accomplished substantially by a pure reversal of the direction of the fluid transport in comparison with a sample injection, wherein only the needle is moved out of the needle seat.

FIG. 1 shows the structure of a HPLC system in principle as an example for a sample separation device 10 according to an exemplary embodiment of the invention, as it may be used for a liquid chromatography, for example. A fluid delivering unit and a fluid drive 20, respectively, which is supplied with solvents from a supply unit 25, drives a mobile phase through a sample separation unit 30 (such as a chromatographic column) which includes a stationary phase. The supply unit 25 encompasses a first fluid component source 113 for providing a first fluid and/or a first solvent component A (for example water) and a second fluid component source 111 for providing another second fluid and/or a second solvent component B (for example an organic solvent). An optional degasser 27 may degas the solvents which are provided by the first fluid component source 113 and by the second fluid component source 111, before these are supplied to the fluid drive 20. A sample application unit, which may also be denoted as injector 40, is arranged between the fluid drive 20 and the sample separation unit 30, to at first receive a sample liquid and/or a fluidic sample from a sample source 137 (for example a sample container) in a sample receiving volume 100 in an injector path 146, and, by switching an injection valve 90 of the injector 40, to subsequently introduce it into a fluidic separation path 104 between the fluid drive 20 and the sample separation unit 30. Receiving the fluidic sample from the sample source 137 may in particular be performed by moving a sample needle 142 which is not illustrated in FIG. 1 out of a sample seat 144 and by displacing it into the sample container 137, by sucking the fluidic sample out of the sample container 137 through the sample needle 142 and into the sample reception volume 100 by a metering unit 130, and by then retracting the sample needle 142 in the needle seat 144 again (compare FIG. 2). The stationary phase of the sample separation unit 30 is provided to separate the components of the sample. A detector 50 which may comprise a flow cell detects the separated components of the sample, and a fractionator device 60 may be provided to output the separated components of the sample into containers which are provided for this purpose. Liquids which are not required anymore may be output in a drain container and/or in a waste conduit 132.

While a liquid path between the fluid drive 20 and the sample separation unit 30 is typically under high pressure, the sample liquid under normal pressure is at first introduced in a region which is separated from the liquid path, a so-called sample loop and/or a sample reception volume 100, of the sample application unit or injector 40 which in turn introduces the sample liquid into the separation path 104 which is under high pressure. A sample loop as sample receiving volume 100 (also denoted as sample loop) may denote a portion of a fluid conduit which is configured for receiving and/or temporarily storing a pre-given amount of fluidic sample. Preferably, before connecting the sample liquid, which is at first under normal pressure, with the sample receiving volume 100 in the separation path 104, which is under high pressure, the content of the sample receiving volume 100 is brought to the system pressure of the sample separation device 10 which is configured as HPLC by a metering unit 130 which is described in more detail below. A control unit 70 controls the individual components 20, 25, 30, 40, 50, 60 of the sample separation device 10.

FIG. 1 shows two supply conduits 171, 173, each of which is fluidically coupled with a respective one of the two solvent containers which are denoted as fluid component sources 113, 111, for providing a respective one of the fluids or solvent components A and B. The respective fluid or the respective solvent component A and/or B is delivered through the respective supply conduit 171 or 173, through the degasser 27 to a proportioning valve 87 as proportioning unit at which the fluids or solvent components A and/or B from the supply conduits 171, 173 are combined with each other. At the proportioning valve 87, the fluid packages from the supply conduits 171, 173 flow together under formation of a homogenous solvent composition. The latter is then supplied to the fluid drive 20.

In operation of the sample separation device 10 and in particular of the injector 40, the injection valve 90 is connected by the control unit 70 for injecting a fluidic sample from the sample receiving volume 100 with a mobile phase in the separation path 104 between the fluid drive 20 and the sample separation unit 30 of the sample separation device 10. This switching of the injection valve 90 is performed for causing a relative motion between a first valve body (which may be a stator which is stationary with respect to a laboratory system) and a second valve body (which may be a rotor which is rotatable with respect to the laboratory system) of the injection valve 90. The first valve body may be provided with multiple ports and optionally with one or more groove-shaped connection structures. In contrast, the second valve body may be equipped with preferably multiple groove-shaped connection structures, to thereby selectively fluidically couple or decouple respective ones of the ports of the first valve body depending on a respective relative orientation between the first valve body and the second valve body by the at least one connection structure of the second valve body. Descriptively, a respective groove-shaped connection structure of the second valve body, in certain switching states of the injection valve 90, may fluidically connect two (or more) of the ports of the first valve body and may form a fluidic decoupling between other ones of the ports of the first valve body. In this way, the individual components of the sample separation device 90 may be commonly brought into an adjustable fluidic (de-)coupling state depending on a respective operation state of the injector 40.

Before and during the above described operation of the injector 40 for receiving the fluidic sample in the sample receiving volume 100 and for subsequently injecting the fluidic sample into a mobile phase in the high pressure separation path 104 between the fluid drive 20 and the sample separation unit 30 of the sample separation device 10, an undesired inclusion of air bubbles or other gas inclusions in the injector path 146 may occur. For example, air bubbles may form in the region of the metering unit 130 which is configured as a syringe pump. Such gas inclusions may be disturbing for the reproducibility and the correctness of a sample separation result, for example may influence characteristics of a chromatogram.

In order to suppress or even to eliminate such undesired artifacts in a sample separation, according to an embodiment of the invention, by the control unit 70, prior to sucking a fluidic sample into the sample receiving volume 100 and prior to injecting the fluidic sample from the injector path 146 into the separation path 104, at first an information may be determined which is indicative for an amount of gas in the injector path 146 of the injector 40. This may include a qualitative and/or quantitative capture of data which gives information about the fact, if and optionally to what extent (further in particular what amount of) gas is present in the injector path 146. In particular, the event of the presence of an excess of gas in the injector path 146 may be recognized, which excess may undesirably or negatively influence a sample separation. Then, the control unit 70 may take an action which may be selected depending on a result of the determination. For example, when detecting an undesirably high excess of gas in the injector path 146, the complete fluid may be drained from the injector path 146 in the waste conduit 132, and only subsequently a sample receiving process may be performed. When detecting an acceptably low amount of gas in the injector path 146, without a further action of correction, sucking the fluidic sample into the sample receiving volume 100 and subsequently injecting the fluidic sample from the sample receiving volume 100 of the injector path 146 into the separation path 104 may be caused by switching the injection valve 90.

Although in FIG. 1 no corresponding details are illustrated, at the injector 40, a procedure for removing air bubbles from the injector path 146 may be performed. For this purpose, two partial paths of the injector path 146 may be brought to different pressures above an ambient pressure separately from each other, for example. Subsequently, both partial paths may be connected with each other and with the ambient pressure, so that an expansion stroke which is thereby generated—caused by a self-adjusting pressure equalization—releases or loosens a gas bubble in the injector path 146. Subsequently, the released gas bubble may be rinsed out of the injector path 146. A sample reception and sample injection may then be performed after removing such a gas bubble from the injector path 146.

According to another aspect, at the injector 40 which is only schematically illustrated in FIG. 1, also a backwards rinsing—in particular of a needle seat (see reference sign 144 in FIG. 10) may be performed, namely by using the fluid drive 20.

Figure 2:
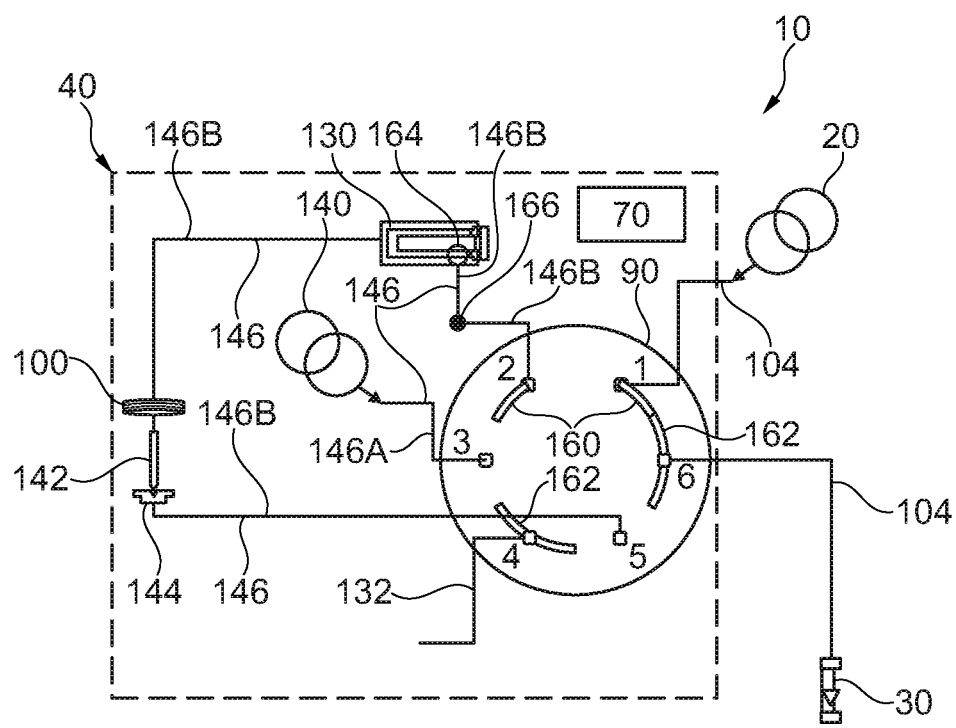
FIG. 2 shows an injector according to an exemplary embodiment of the invention in a first operational state.
Figure 3:
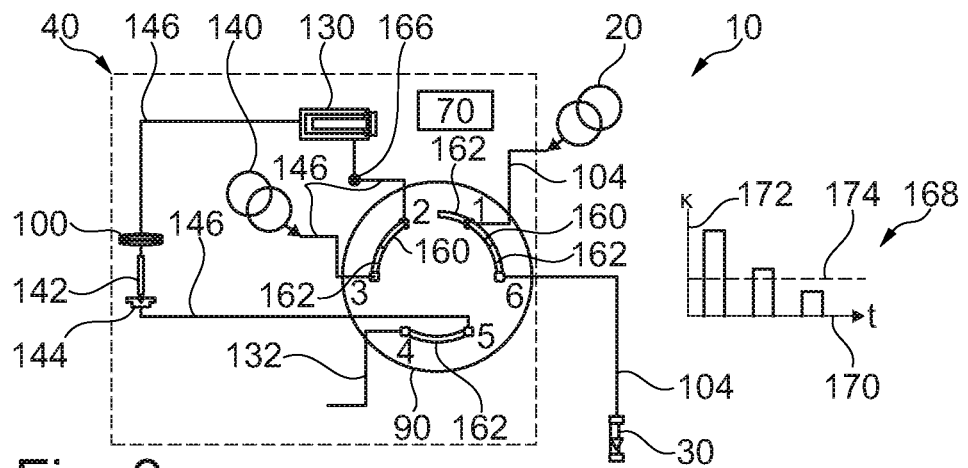
FIG. 3 shows the injector according to FIG. 2 in a second operational state.

Advantageous embodiments of injectors 40 according to exemplary embodiments of the invention and different operation modes which are supported by them are described in more detail in the following:

FIG. 2 shows an injector 40 of a sample separation device 10 according to an exemplary embodiment of the invention in a first operational state, in which an information is determined which is indicative for an amount of gas in an injector path 146. In particular, it may be determined, if gas bubbles are located in the injector path 146. Furthermore, in the illustrated first operational state, two partial paths 146A, 146B of the injector path 146 may be brought to an elevated pressure separately from each other. With the reference sign 164 in FIG. 2, a critical position in the injector 40 is illustrated, where frequently an undesired gas bubble may be located and attached in operation. This position relates to a fluidic interface of the metering unit 130, i.e. an inlet and/or outlet for the fluid. In particular when rinsing the injector path 146 by a rinsing liquid which is delivered by a rinsing pump 140 and which is not completely degassed, such a gas bubble may be transported in the injector path 146. FIG. 3 shows the injector 40 according to FIG. 2 in a second operational state, in which, by a rinsing pump 140, the liquid from the injector path 146 with an excessive amount of gas—in particular with the previously released gas bubble—is drained in a waste conduit 132.

An injection valve 90 is installed in a liquid chromatography sample separation device 10 for separating a fluidic sample. As can be seen in FIG. 2 and FIG. 3, the sample separation device 10 comprises a fluid drive 20 which is configured as a high pressure pump for driving a mobile phase (i.e. a solvent or a solvent composition), and a fluidic sample which is to be injected into the mobile phase by the injector 40. The fluidic sample shall be separated into its fractions by the sample separation device 10. The actual separation is performed by the sample separation unit 30 which is configured as a chromatography separation column, after the injection of the fluidic sample into the mobile phase.

The injection valve 90 of the injector which is illustrated in FIG. 2 and FIG. 3 serves for injecting the fluidic sample into the mobile phase in a separation path 104 between the fluid drive 20 and the sample separation unit 30. For this purpose, the injector 40 comprises a sample receiving volume 100 which is configured as a sample loop, for example, for receiving a pre-given volume of the fluidic sample. Furthermore, the injector 40 which is illustrated in FIG. 2 and FIG. 3 contains a metering unit 130 which is configured as a syringe pump with a movable piston, for example, for metering the fluidic sample which is to be received in the sample receiving volume 100. Thus, the metering unit 130 primarily serves for metering a fluidic sample which is to be received in the sample receiving volume 100, but may also be operated for compressing the fluid in the injector path 146 (see FIG. 2). A waste conduit 132 serves for discharging a fluid which is not required anymore, for example a rinsing liquid, a mobile phase which is not required anymore, or a fluidic sample which is not required anymore. In particular, the waste conduit 132 also serves for discharging a fluid with an excessive amount of gas from the injector path 146 (compare FIG. 3).

Moreover, the injector 40 has a displaceable needle 142 which is fluid-tightly received in a needle seat 144 for fluid-tightly receiving the needle 142, according to FIG. 2 and FIG. 3. Although not shown, the needle 142 may also be moved out of the needle seat 144 and may be inserted into a sample container with the fluidic sample which is not shown, to subsequently, by retracting the piston of the metering unit 130, suck the fluidic sample from the sample container through the needle 142 and into the sample receiving volume 100.

The injection valve 90, which is configured as a rotor valve in the illustrated embodiment, has stationary ports or fluid terminals which are indicated by 1 to 6, a part of which are connected with stationary grooves 160. Opposite to these stationary ports 1 to 6 and/or grooves 160, rotatable grooves 162 are provided, so that different fluidic connection paths may be adjusted. The injection valve 90 according to FIG. 2 and FIG. 3 is fluidically coupled with the sample receiving volume 100, the metering unit 130, and the waste conduit 132, and is switchable by the control unit 70. According to FIG. 2, the injection valve 90 is brought into a switching position, in which the injector path 146 is separated into two fluidically decoupled partial paths 146A, 146B, which are both blocked independently from each other. The first partial path 146A extends from the rinsing pump 140 to the fluid valve 90 (in particular up to port 3 of the fluid valve 90). The second partial path 146B extends from the fluid valve 90 (in particular from port 2 of the fluid valve 90) via the metering unit 130, the sample receiving volume 100, the needle 142, and the needle seat 144 back up to the fluid valve 90 (in particular up to port 5 of the fluid valve 90).

Referring to FIG. 2, the fluid drive 20 which is configured as high pressure pump delivers the mobile phase through the injection valve 90 along the separation path 104 to the sample separation unit 30 which is configured as chromatography separation column. Furthermore, the injection valve 90 is in such a position, that, along the injector path 146, a fluidic coupling from the metering unit 130 via the sample receiving volume 100, the needle 142, and the needle seat 144 up to port 5 of the injection valve 90 is formed. Since the port 5 is not further fluidically connected, the second partial path 146B of the injector path 146 is blocked at port 5. The rinsing pump 140 is connected to port 3, so that the first partial path 146A is blocked.

The injector 40 which is illustrated in FIG. 2 is controlled by the control unit 70. In the configuration according to FIG. 2, the control unit 70 may determine an information which is indicative for an amount of gas in the injector path 146 of the injector 40. In more detail, the control unit 70 may determine the information, if in the injector path 146—and in particular in the partial path 146B—an undesired excess of gas in the form of one or more gas bubbles is located. For determining the information, the control unit 70 may switch the injection valve 90 into the valve position according to FIG. 2, wherein thereby the injector path 146 is blocked at port 5 and, by a forward motion of the piston of the metering unit 130, the fluid which is located in the partial path 146B of the injector path 146 is compressed. Therefore, the control unit 70 is configured to compress the fluid which is located in the second partial path 146B of the injector path 146 by actuating the metering unit 130. In the compressed state of the second partial path 146B of the injector path 146, a pressure measurement may be performed in the injector path 146, for example by one or more pressure sensors which are arranged in the second partial path 146B of the injector path 146. Such a pressure sensor 166 is illustrated in FIG. 2 and FIG. 3. Advantageously, such a pressure sensor 166 may be located between the injection valve 90 and the metering unit 130. Furthermore, the piston position of the metering unit 130 may be monitored or detected, wherein thereby, in the compressed state, the change in volume in the second partial path 146B of the injector path 146 may be determined due to the pressurizing. From the determined pressure and the determined change in volume, the control unit 70 may determine the compressibility of the fluid which is located in the second partial path 146B of the injector path 146, for example of a solvent and possible gas inclusions. A relatively high compressibility indicates the presence of a considerable amount of gas in the second partial path 146B of the injector path 146, since gas is highly compressible. In contrast, a relatively low compressibility indicates the presence of a considerable amount of liquid in the second partial path 146B of the injector path 146, since liquid is only compressible to an extremely low extent. Descriptively, the compressibility of gases may be about 1000 times higher than the compressibility of liquids, for example. Thus, the determination of the compressibility enables a qualitative or even quantitative information about the amount of gas in the injector path 146, and in particular about the presence of gas bubbles.

A diagram 168 which is illustrated in FIG. 3 shows the time dependency of the determined compressibility K which may be determined based on the pressure values which are measured by the pressure sensor 166, based on a piston position of the metering unit 130, and based on a pre-known system volume of the injector path 146 or of its first partial path 146B. The diagram 168 has an abscissa 170, along which the time t is plotted. Along an ordinate 172, the compressibility K is plotted. The reference sign 174 denotes a pre-given threshold value of the compressibility K, wherein in the case of its exceeding, the presence of an undesirably high gas load in the injector path 146 is assumed. Three compressibility bars in the diagram 168 show the value of the compressibility in a first measurement, in a second measurement after performing a first gas bubble removing procedure (as described below), and in a third measurement after performing a second gas bubble removing procedure. Only the third measurement shows a value of the compressibility below the threshold value 174. Therefore, the gas bubble removing procedure is terminated only after the third measurement in the illustrated example.

The control unit 70, depending on a result of the determination of the information which is indicative for the amount of gas in the injector path 146 (in particular a value of the compressibility), may then take an assigned action.

If determining the information does not yield an undesired amount of gas, the control unit 70, as the action to be taken, may control the injector 40 for receiving a fluidic sample in the sample receiving volume 100 and for subsequently injecting the fluidic sample into the mobile phase in the separation path 104 between the fluid drive 20 and the sample separation unit 30.

In contrast, if determining the information yields an undesired amount of gas in the injector path 146, the control unit 70, as action to be taken, may cause a removal of the gas bubble from the injector path 146. For example, the control unit 70 may assume an undesired amount of gas in the injector path 146, when the determined compressibility exceeds a predetermined threshold value. Alternatively or additionally, the control unit 70 may be configured to assume an undesired amount of gas, when the determined compressibility is outside a predetermined acceptance range of about 5% from a compressibility which is determined in a previous injection process. When an excess of gas in the injector path 146 is detected, for removing the gas from the injector path 146, the control unit 70 may discharge the fluid which is contained in the injector path 146 in the waste conduit 132. For this purpose, the control unit 70 may correspondingly switch the injection valve 90.

In the following, a procedure for removing gas from the injector path 146 is described in more detail, as it may be performed according to an embodiment of the invention. This embodiment enables a removal of gas from the injector path 146, even when a gas bubble is attached in the injector path 146—for example at a poorly rinsed position.

Before performing such a gas bubble removing procedure, it is possible, to rinse the injector path 146 by the rinsing pump 140 with a rinsing liquid, for example with a suitable solvent composition. This may be performed in a valve position of the injection valve 90 according to FIG. 3. Subsequently, the injection valve 90 may be switched into the valve position according to FIG. 2.

Referring to FIG. 2, a first overpressure is generated in the blocked first partial path 146A of the injector path 146 by the rinsing pump 140. Furthermore, a second overpressure is generated in the blocked second partial path 146B of the injector path 146 by the metering unit 130. For this purpose, a piston of the metering unit 130 according to FIG. 2 may be moved from the right-hand side to the left-hand side. For example, the first partial path 146A may be brought to a pressure in a range of 150 bar to 200 bar. In contrast, the second partial path 146B may be brought to the system pressure (i.e. to a pressure between the fluid drive 20 and the sample separation unit 30), for example 1200 bar. It may be preferred that the overpressure in the second partial path 146B be adjusted to be larger than in the first partial path 146A.

Subsequently, controlled by the control unit 70, the injection valve 90 may be transferred to the valve position which is illustrated in FIG. 3, wherein thereby the first partial path 146A is fluidically coupled with the second partial path 146B. In more detail, a continuous fluidic coupling from the rinsing pump 140, through the injection valve 90, the metering unit 130, the sample receiving volume 100, the needle 142, the needle seat 144, in turn the injection valve 90, and the waste conduit 132 is formed. Thereby, the first partial path 146A which was previously brought to overpressure, and the second partial path 146B which was previously brought to overpressure, relax against the waste conduit 132 which is under atmospheric pressure. This relaxation, caused by switching the injection valve 90, results in a pressure impact or expansion stroke which releases or loosens the gas bubble which is for example attached to the metering unit 130 (see reference sign 164 in FIG. 2). During or after the expansion stroke, for rinsing the released gas bubble out of the injector path 146, the control unit 70 may control the rinsing pump 140 for delivering a mobile phase, in more detail for delivering the rinsing liquid. Descriptively, the delivered rinsing liquid may transport the previously released or loosened gas bubble and may discharge it via the waste conduit 132.

Referring to the diagram 168, by determining the compressibility in the injector path 146 (respectively in its second partial path 146B), it may subsequently be detected, if the injector path 146 is free from gas bubbles now or comprises still an undesirably high gas load. In the latter case, the control unit 70 may repeat the procedure of generating overpressures in both of the separated and blocked partial paths 146A, 146B, subsequently coupling the partial paths 146A, 146B with each other for generating an expansion stroke, and rinsing a shaken-free gas bubble from the injector path 146 once or multiple times. For example, this may be performed until the determined compressibility K falls below the threshold value 174. Subsequently, a fluidic sample may be received in the sample receiving volume 100, may be injected, and subsequently separated.

As described, prior to injecting the fluidic sample into the mobile phase in the separation path 104 between the fluid drive 20 and the sample separation unit 30, the control unit 70 may perform the information determination with respect to an amount of gas in the injector path 146. This may be performed preferably prior to receiving the fluidic sample in the sample receiving volume 100. Thereby, it may be avoided, that useless separation runs are performed, which, due to the presence of a considerable amount of gas in the injector path 146, may deliver inaccurate or poorly reproducible separation results.

Therefore, with the embodiment according to FIG. 2 and FIG. 3, an accurate and precise metering of liquid samples is enabled. Prior to measuring a fluidic sample, the injector path 146 is compressed to a certain pressure, by forwardly displacing a piston of the metering unit 130 and/or by a rinsing pump 140 generating an overpressure, while the injection valve 90 is placed in a blocked position. The compressibility in the injector path 146 (or in a part of it) may be calculated and compared with a stored upper limit (which may be defined by experiment, for example).

This procedure may lead to different events:

A first result may be as follows: if the boundary value of the compressibility is exceeded, it may be concluded that air was present in the injector path 146, which disturbs the exact and accurate measurement of the sample. The sample separation method may be finished or not (for example there is the possibility to completely abort the separation run). Subsequently, a method may be triggered, to remove the air. At the end of the air removal cycle, the compressibility may be calculated again. If the upper limit is still exceeded, the cycle of the gas removal may be repeated.

A second result may be as follows: if the boundary value of the compressibility is not exceeded, but it is detected, that the determined value of the compressibility is in a (for example predefined) range which indicates the presence of air, the calculated value may be stored. The injection event may then be finished. If the solvent which is present in the fluid path stays the same, the value remains stored. If the solvent is replaced (for example by a change of the separation method or by triggering a so-called "prime" procedure with a fresh solvent), the value may be deleted. Two cases may be differentiated:

Case 1—the solvent was changed: the value is deleted, the process is repeated, and it is examined whether the upper limit is exceeded or not.

Case 2—a stored value is present (no solvent change): the value is used as a reference value for the next sample taking event. The compressibility is calculated and compared with a stored value. In case of deviations of more than ±5%, for example (wherein other acceptance ranges may be defined), the air removing procedure is triggered. This may be repeated.

A third result may be as follows: the value is within ±5% of the previously stored value and is traced, to react on changes.

Again referring to FIG. 2, the injection valve 90 of the injector 40 is shown in a position in which the fluidic sample can be drawn. Furthermore, in this switching position of the injection valve, compressing or decompressing the injector path 146 is enabled.

In the operational state according to FIG. 2, the injector path 146 may at first be compressed to a maximum pressure, in particular its second partial path 146B. Subsequently, the compressibility in the partial path 146B may be calculated: when the compressibility yields an unexpected value, which indicates a presence of a gas bubble in the injector path 146, the subsequently described gas bubble removing procedure may be triggered. Otherwise, the fluidic sample may be drawn, injected, and separated.

In the context of the gas bubble removing procedure, also the rinsing pump 140 may be compressed to generate an overpressure in the first partial path 146A of the injector path 146.

Subsequently, it may be waited some seconds for a pressure equalization and/or saturation of the pressure conditions in the injector path 146.

Subsequently, the injection valve 90 may be switched to the rinsing position which is shown in FIG. 3, to generate an expansion stroke for releasing the gas bubble, and to then rinse the released gas bubble out of the injector path 146.

By switching the injection valve 90 in the rinsing position, the injector path 146 is relaxed. As a consequence, the previously compressed solvent expands with the speed of sound in the direction of the waste conduit 132. Subsequently, it may be started to displace the metering pump piston forwardly, to eject the solvent, which is saturated with air. The discharge of the solvent with the gas bubble may also be promoted by the rinsing pump 140, when it is controlled for delivering a solvent.

If necessary, the described gas bubble removing procedure may be repeated until the repeatedly determined compressibility indicates that the fluid in the injector path 146 now contains at most a sufficiently or acceptably low amount of gas.

Figure 4:
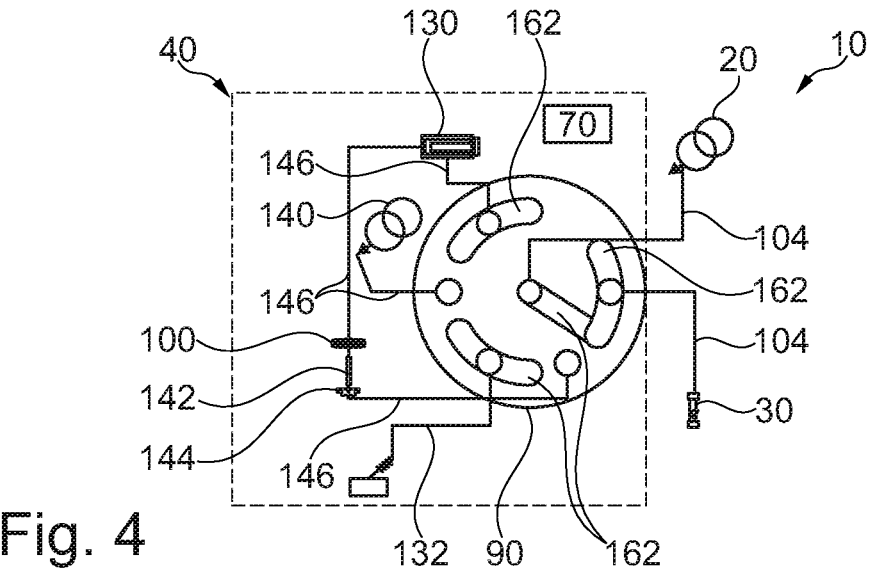
FIG. 4 shows an injector according to another exemplary embodiment of the invention in a first operational state.
Figure 5:
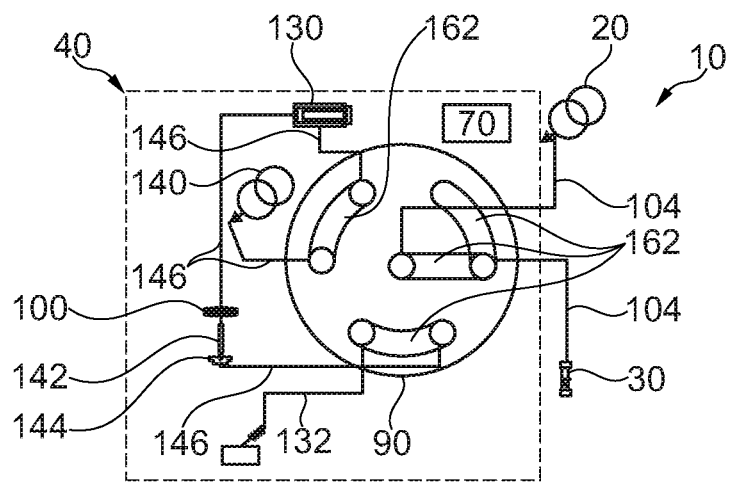
FIG. 5 shows the injector according to FIG. 4 in a second operational state.

FIG. 4 shows an injector 40 according to another exemplary embodiment of the invention in a first operational state. FIG. 5 shows the injector 40 according to FIG. 4 in a second operational state.

The embodiment according to FIG. 4 and FIG. 5 differs from the embodiment according to FIG. 2 and FIG. 3 substantially in that, according to FIG. 4 (whose operational state corresponds to that of FIG. 2) and according to FIG. 5 (whose operational state corresponds to that of FIG. 3), another valve configuration of the injection valve 90 is shown. In more detail, FIG. 4 and FIG. 5 show an injection valve 90, wherein the fluid drive 20 is connected to a central contact, i.e. to a port in the center of the injection valve 90.

Figure 6:
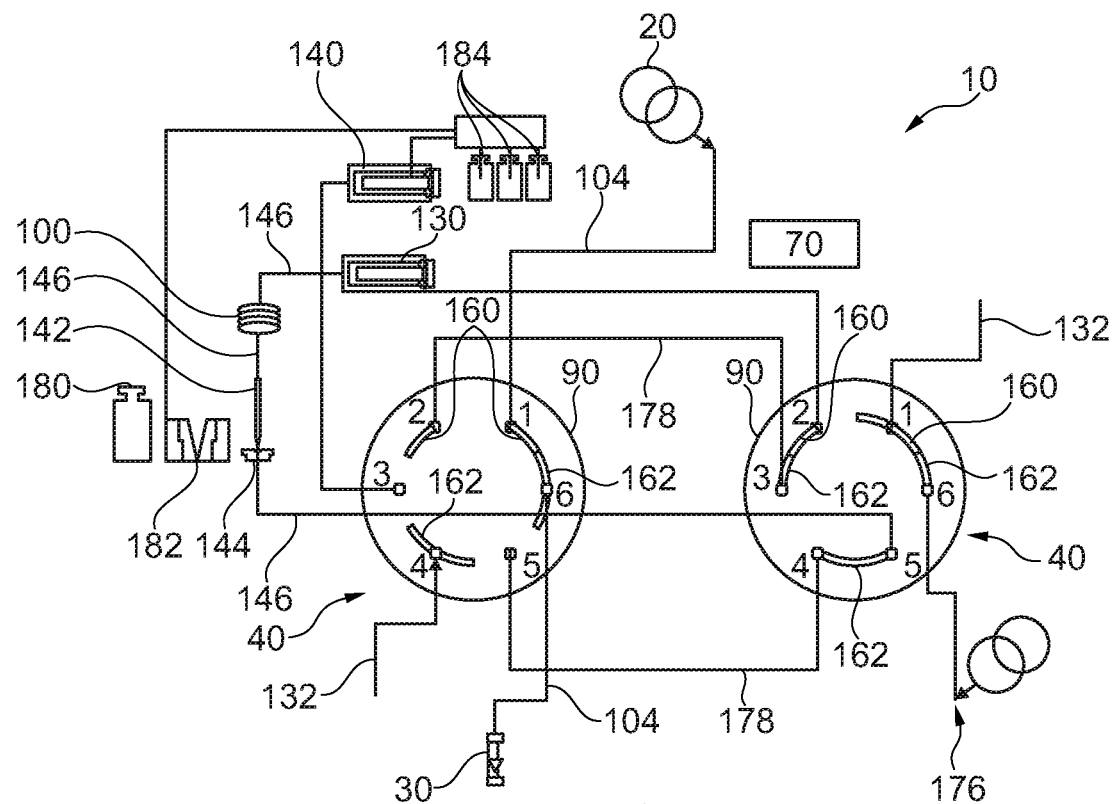
FIG. 6 shows an injector according to a further exemplary embodiment of the invention in a first operational state.
Figure 7:
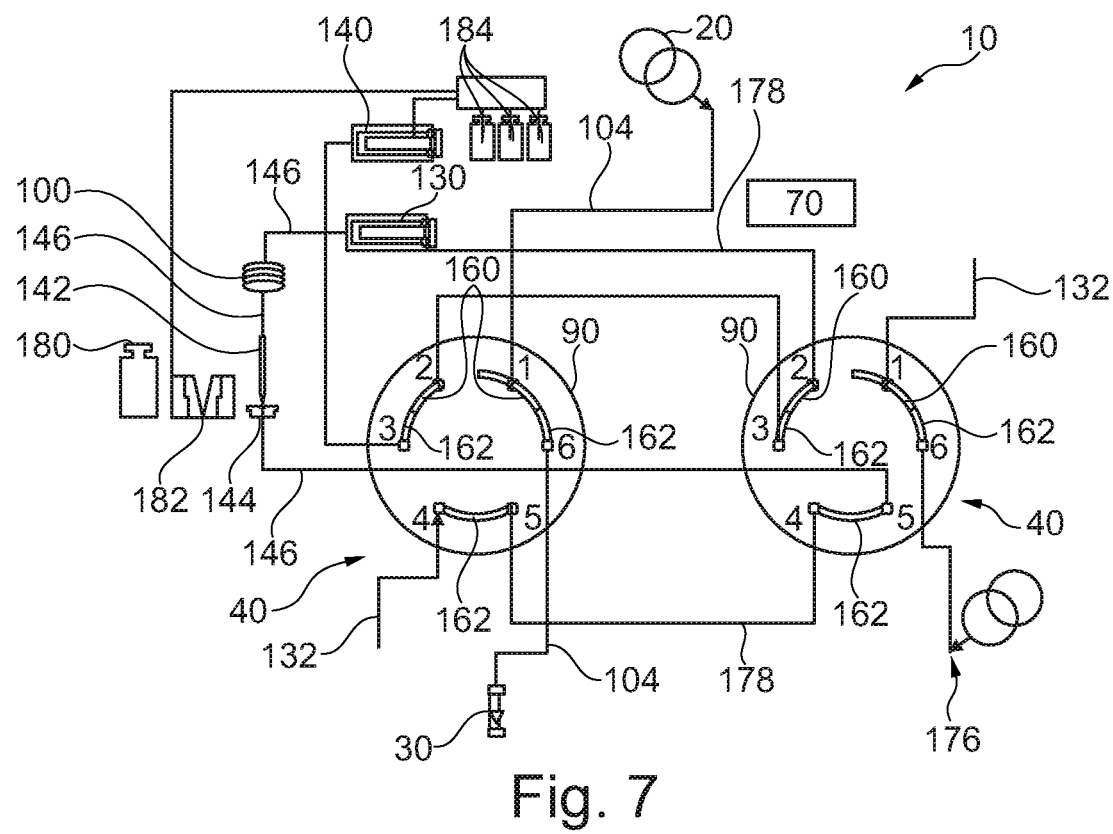
FIG. 7 shows the injector according to FIG. 6 in a second operational state.

FIG. 6 shows an injector 40 according to a further exemplary embodiment of the invention in a first operational state. FIG. 7 shows the injector 40 according to FIG. 6 in a second operational state.

The embodiment according to FIG. 6 and FIG. 7 differs from the embodiment according to FIG. 2 and FIG. 3 substantially in that, according to FIG. 6 (whose operational state corresponds to that of FIG. 2) and FIG. 7 (whose operational state corresponds to that of FIG. 3), two correspondingly formed injection valves 90 are provided. The second injection valve 90 enables the introduction of a fluidic sample to be separated from a reactor flow 176. Both injection valves 90, 90 are fluidically coupled with each other by connection capillaries 178. Therefore, according to FIG. 6 and FIG. 7, a fluidic sample to be separated may be selectively received from a sample container 180 or from the reactor flow 176, and may be separated.

FIG. 6 and FIG. 7 additionally show a rinsing seat 182 for receiving the needle 142 during a rinsing procedure. FIG. 6 and FIG. 7 further illustrate a solvent container 184 with the rinsing liquids, which may be used for rinsing by the rinsing pump 140.

Figure 8:
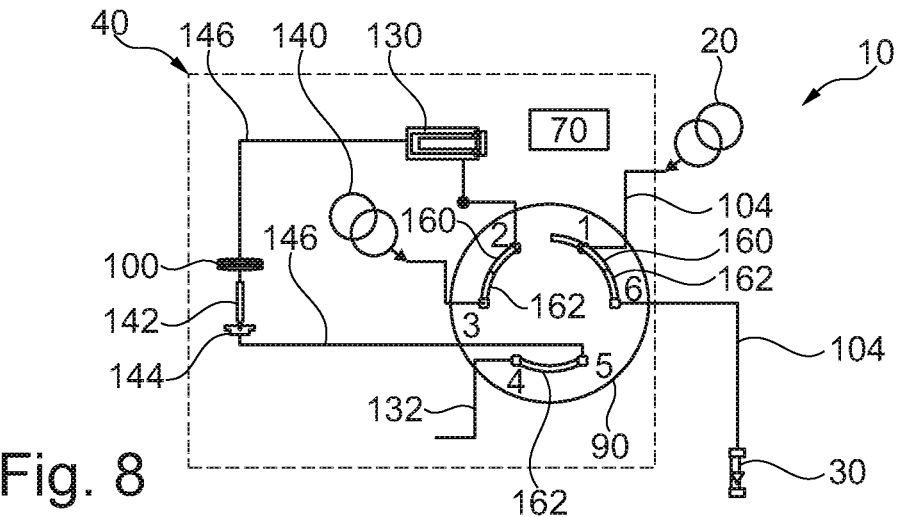
FIG. 8 shows an injector according to yet another exemplary embodiment of the invention in a first operational state.
Figure 9:
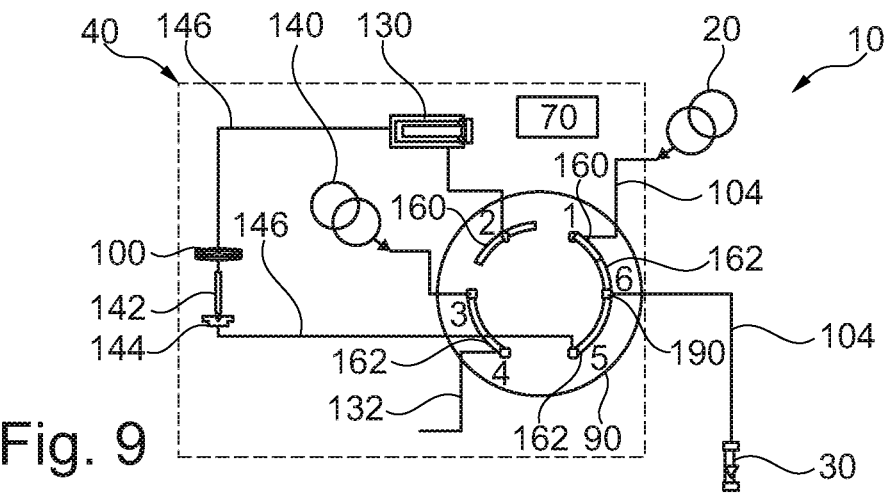
FIG. 9 shows the injector according to FIG. 8 in a second operational state.
Figure 10:
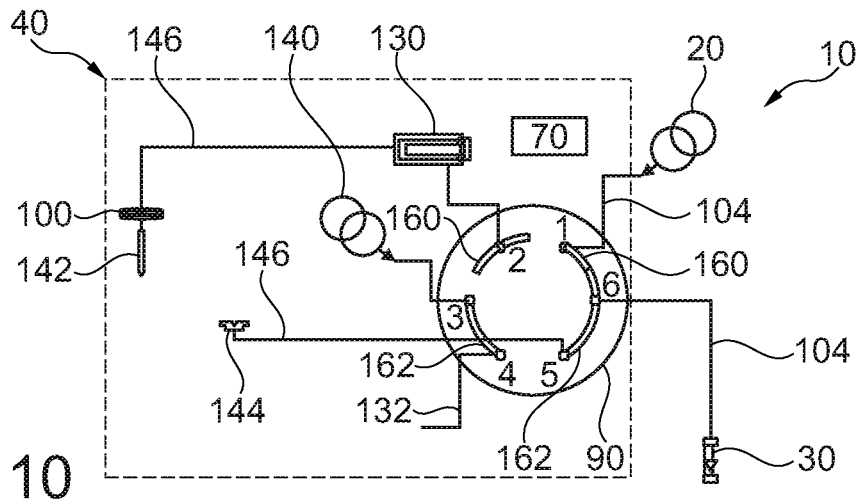
FIG. 10 shows the injector according to FIG. 8 or FIG. 9 in a third operational state.

FIG. 8 shows an injector 40 according to yet another exemplary embodiment of the invention in a first operational state. FIG. 9 shows the injector 40 according to FIG. 8 in a second operational state. FIG. 10 shows the injector 40 according to FIG. 8 or FIG. 9 in a third operational state.

According to FIG. 8, the injection valve 90 is in a bypass valve position. In this, the mobile phase is delivered from the fluid drive 20 through the injection valve 90 to the sample separation unit 30, while the injector path 146 is fluidically decoupled from it and may be operated independently from it. For example, in this valve position, by moving the needle 142 out of the needle seat 144, and by introducing the needle 142 into a sample container, and by retracting the piston of the metering unit 130, the fluidic sample may be introduced from the sample container through the needle 142 in the sample receiving volume 100. Subsequently, the needle 142 may be retracted back into the needle seat 144. In the valve position according to FIG. 8, it is also possible, to rinse the injector path 146 by the rinsing pump 140.

In the valve position according to FIG. 9, the fluidic sample from the sample receiving volume 100 may be injected into the separation path 104 between the fluid drive 20 and the sample separation unit 30, namely according to a "feed inject" injection principle. For this purpose, by a forward motion of the piston of the metering unit 130, the fluidic sample from the sample receiving volume 100 is delivered through the needle 142 and the needle seat 144 and through the injection valve 90 to a fluidic T-point 190, where the fluidic sample is combined with the mobile phase which is driven from the fluid drive 20 to the sample separation unit 30.

After the described sample injection, it may be desirable to rinse the needle seat 144, to avoid an undesired carryover of sample in a subsequent separation run. For this purpose, according to FIG. 10, the control unit 70 may control the injector 40, such that after moving the needle 142 out of the needle seat 144, the needle seat 144 is backwardly rinsed, and namely by the fluid drive 20. Thus, the arrangement according to FIG. 8 to FIG. 10 has the capability for a seat backwards rinsing with the fluid drive 20, i.e. by the analytical pump (fluid drive 20) of the chromatographic sample separation device 10.

Conventionally, the needle seat 144 is rinsed only in one direction. Carryover of sample into hollows may occur, and the needle seat 144 may be blocked by particles.

According to the exemplary embodiment of the invention of FIG. 8 to FIG. 10, a feed injector 40 is provided, wherein the fluid drive 20 is connected in the advance position to the needle seat 144. Lifting the needle 142 leads to the mobile phase flowing mainly out of the needle seat 144, whereby it is backwardly rinsed. In an advantageous manner, this may be performed without human interaction. An undesired clogging may thus be avoided without human interaction.

Concluding, according to FIG. 8 to FIG. 10, the needle 142 is at first removed from the needle seat 144, and lifted or placed in an auxiliary seat.

Then, the fluid drive 20 (i.e. the analytical pump) may be connected or switched on. The delivered solvent mainly passes through the needle seat 144 (due to the high restriction within the sample separation unit 30 which is configured as a chromatographic column). Optionally, the sample separation unit 30 may be demounted for rinsing and a blind plug may be connected, to avoid a clogging. Should a stubborn clogging occur, it may be pumped with a high pressure, while the column is protected from it.

It should be noted, that the term "comprising" does not exclude other elements, and that the term "a" does not exclude a plurality. Also elements which are described in connection with different embodiments may be combined. It should also be noted, that reference signs in the claims are not to be construed as limiting the scope of the claims.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the control unit 70 schematically depicted in FIGS. 1 to 10. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), application specific integrated circuits (ASICs), or field-programmable gate arrays (FPGAs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the control unit 70 schematically depicted in FIGS. 1 to 10), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

What is claimed is:

1. A separation device, comprising:
    a separation path between a fluid drive and a sample separation unit, wherein the sample separation device is configured to inject a fluidic sample in an injector path into a mobile phase in the separation path driven by the fluid drive to the sample separation unit for chromatographically separating the fluidic sample; and
    a control unit configured to control an operation comprising:
        blocking the injector path or at least a partial path thereof;
        generating an overpressure in the blocked injector path or the partial path thereof by a pressure source; and
        subsequently fluidically coupling the injector path or the partial path thereof to a region of lower pressure than the overpressure to generate an expansion stroke for releasing unwanted components from the injector path.

2. The sample separation device of claim 1, wherein the fluid drive is configured to generate a system pressure in the separation path for driving the mobile phase and the fluidic sample to the separation unit, and the control unit is configured to generate the overpressure at a pressure corresponding to the system pressure.

3. The sample separation device of claim 2, wherein the system pressure is selected from the group consisting of: a pressure of at least 500 bar; a pressure of at least 1000 bar; and a pressure of at least 1200 bar.

4. The sample separation device of claim 1, wherein the control unit is configured to generate the overpressure at a pressure selected from the group consisting of: a pressure in a range from 400 bar to 2000 bar; and a pressure in a range from 700 bar to 1500 bar.

5. The sample separation device of claim 1, wherein the region of lower pressure comprises a waste conduit.

6. The sample separation device of claim 1, wherein the region of lower pressure is at ambient pressure.

7. The sample separation device of claim 1, wherein, simultaneously with and/or after generating the expansion stroke, the control unit is configured to control rinsing the injector path to discharge the unwanted components to the region of lower pressure.

8. The sample separation device of claim 1, wherein the pressure source is selected from the group consisting of: a metering unit for metering the fluidic sample in the injector path; a rinsing pump for rinsing the injector path; the fluid drive; and a pump that is separate from the fluid drive.

9. The sample separation device of claim 1, wherein the unwanted components comprise at least one of: one or more particles; one or more sample residues; one or more bubbles.

10. The sample separation device of claim 1, comprising an injection valve controllable by the control unit to block the injector path or the partial path thereof and to subsequently fluidically couple the injector path or the partial path thereof to the region of lower pressure.

11. The sample separation device of claim 1, wherein the control unit is configured to control injecting the fluidic sample in the injector path into the mobile phase in the separation path by flow-through injection, by which a sample reception volume containing the fluidic sample is connected into the separation path between the fluid drive and the sample separation unit.

12. The sample separation device of claim 1, wherein the control unit is configured to control injecting the fluidic sample in the injector path into the mobile phase in the separation path by feed injection, by which the injector path is connected to the separation path at a fluidic T-point to combine the fluidic sample with the mobile phase.

13. A method for operating a sample separation device, the method comprising:
    providing a separation path between a fluid drive and a sample separation unit of the sample separation device, wherein the sample separation device is configured to inject a fluidic sample in an injector path into a mobile phase in the separation path driven by the fluid drive to the sample separation unit for chromatographically separating the fluidic sample;
    blocking the injector path or at least a partial path thereof;
    generating an overpressure in the blocked injector path or the partial path thereof by a pressure source; and subsequently fluidically coupling the injector path or the partial path thereof to a region of lower pressure than the overpressure to generate an expansion stroke for releasing unwanted components from the injector path.

14. The method of claim 13, wherein the fluid drive is configured to generate a system pressure in the separation path for driving the mobile phase and the fluidic sample to the separation unit, and the method comprises generating the overpressure at a pressure corresponding to the system pressure.

15. The method of claim 14, wherein the system pressure is selected from the group consisting of: a pressure of at least 500 bar; a pressure of at least 1000 bar; and a pressure of at least 1200 bar.

16. The method of claim 13, wherein the overpressure is generated at a pressure selected from the group consisting of: a pressure in a range from 400 bar to 2000 bar; and a pressure in a range from 700 bar to 1500 bar.

17. The method of claim 13, wherein the region of lower pressure comprises a waste conduit.

18. The method of claim 13, wherein the region of lower pressure is at ambient pressure.

19. The method of claim 13, comprising, simultaneously with and/or after generating the expansion stroke, rinsing the injector path to discharge the unwanted components to the region of lower pressure.

20. The method of claim 13, wherein the unwanted components comprise at least one of: one or more particles; one or more sample residues; one or more bubbles.

* * * * *